June 23, 1942.        P. T. FARNSWORTH        2,287,607
RECTIFIER
Filed March 5, 1940
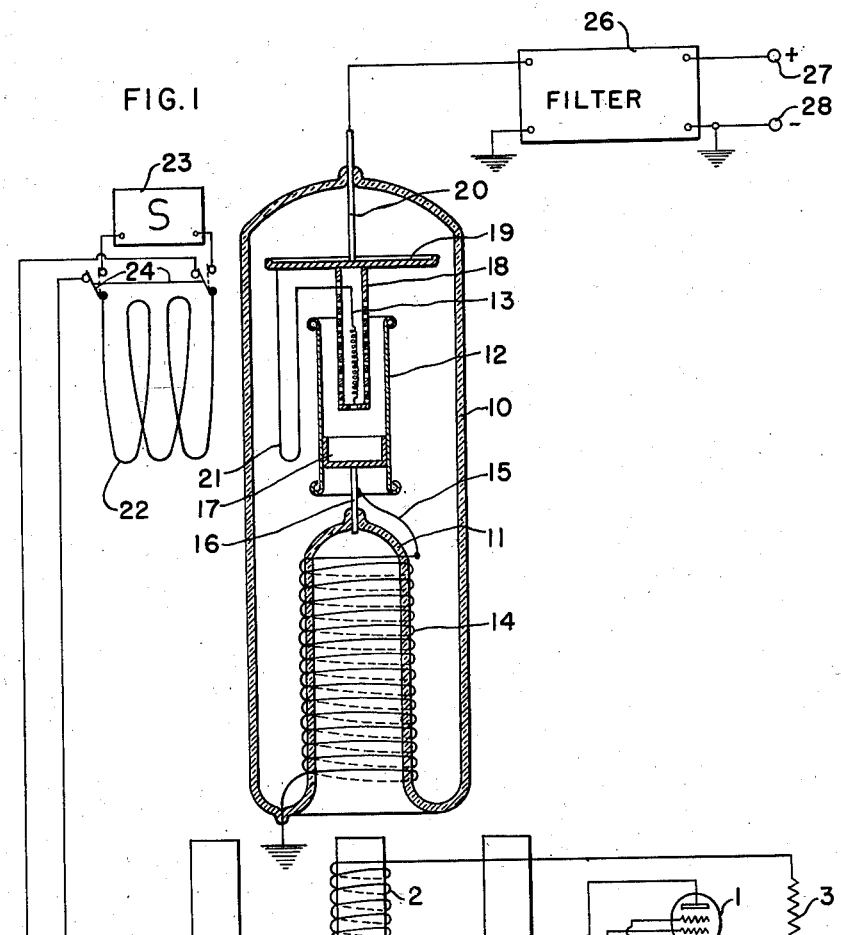
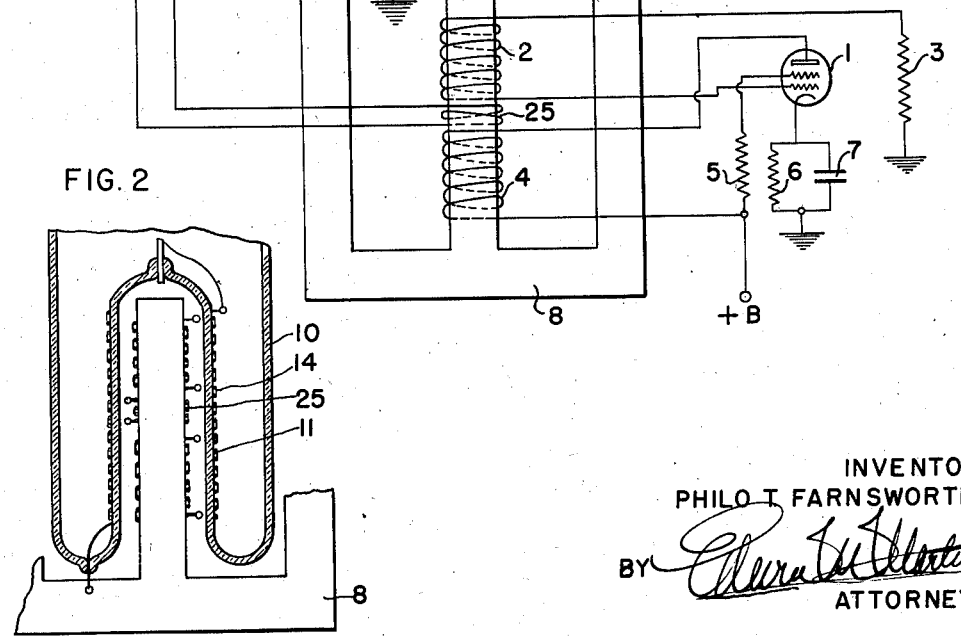
INVENTOR
PHILO T. FARNSWORTH
BY
ATTORNEY Patented June 23, 1942

2,287,607

UNITED STATES PATENT OFFICE 2,287,607

RECTIFIER

Philo T. Farnsworth, Fort Wayne, Ind., assignor to Farnsworth Television and Radio Corporation, a corporation of Delaware Application March 5, 1940, Serial No. 322,362

1 Claim. (Cl. 250—27.5)

This invention relates to rectifier tubes for rectifying alternating voltages or currents of relatively high frequencies.

In conventional systems for rectifying alternating voltages of relatively high frequencies, a transformer secondary winding is usually coupled to the transformer primary winding across which the alternating voltage is produced and an increase in alternating voltage across the secondary winding is obtained by proper choice of the transformer ratio. The transformed alternating voltage developed across the secondary winding is then applied to a vacuum tube rectifier to develop a unidirectional voltage.

Since the alternating voltage produced across the transformer primary winding may be of considerable magnitude, of the order of 10,000 volts or more, and the transformed alternating voltage across the secondary winding is still higher, proper insulation of the secondary winding with respect to the primary winding and the iron core thereof is a difficult problem.

In conventional rectifier systems of this type it is also customary to derive the heating power for the cathode of the vacuum tube rectifier from the primary transformer winding. For this purpose another secondary winding is usually inductively coupled to the primary winding for inducing alternating currents of high frequency in a heater element or in the filament of the vacuum tube rectifier. Since the cathode of the vacuum tube rectifier represents the positive terminal of the unidirectional voltage source represented by the rectifier, the insulation of the winding connected to the heater or filament with respect to the primary winding and its iron core also represents a serious problem.

The object of the present invention therefore is to provide a new and improved rectifier system in which satisfactory insulation is obtained by relatively simple means.

In accordance with the present invention there is provided a rectifier structure comprising an envelope having a hollow reentrant stem, a cathode and an anode. A secondary winding is wound on the reentrant stem within the envelope and supported thereby. This winding is connected to the anode and adapted to be coupled to a primary winding disposed within the reentrant stem outside of the envelope.

For a better understanding of the invention, together with other and further objects thereof, reference is had to the following description, taken in connection with the accompanying drawing, and its scope will be pointed out in the appended claim.

In the accompanying drawing, Fig. 1 is a circuit diagram of a rectifier system showing in longitudinal cross-section a vacuum tube rectifier embodying the present invention, with certain parts shown displaced for the purpose of clarity, while Fig. 2 shows a fragmentary view of the rectifier with its component parts in assembled position.

Referring now to Fig. 1 of the drawing, there is shown schematically a rectifier system including a rectifier embodying the present invention with certain elements shown in displaced positions.

For the purpose of generating a magnetic flux of varying intensity there is provided an electrical oscillator comprising an oscillator tube 1, having a cathode, a control grid, a screen grid and an anode. A winding 2 in series with a resistor 3 is connected in the control grid circuit of the tube 1 and a winding 4 is connected in its anode circuit. One terminal of the anode circuit is connected to a source of positive unidirectional operating potential indicated at +B. The screen grid of the tube is also connected to the source +B by way of a suitable resistor 5. A circuit comprising a resistor 6 and a condenser 7 connected in parallel is disposed in the cathode lead of the oscillator tube 1 for the purpose of providing a proper operating bias potential. The grid winding 2 and anode winding 4 are inductively coupled by means of an iron transformer core, indicated at 8, in which a magnetic flux of varying intensity is generated.

For the purpose of rectifying the alternating voltage developed across the windings 2 and 4, there is provided a vacuum tube rectifier comprising an evacuated envelope 10 having a re-entrant stem 11, an anode 12 and a cathode 13. Disposed on the re-entrant stem 11 within the evacuated space of the envelope 10 is a winding 14, one terminal of which is connected to ground, as shown, and thereby indirectly to the cathode 13, while the other terminal thereof is connected to the anode 12 by way of a lead 15, a conductive anode supporting rod 16, and a conductive anode supporting cup 17. The cathode 13 is supported by means of a perforated cylinder 18 conductively connected to a shield 19 which is supported by a conducting rod 20. Supporting the cathode 13 is a wire loop 21 of rigid material, one end of which is attached to the cathode 13 while its other end is connected to the shield 19. Shield 19, wire loop 21, cathode 13 and perforated cylinder 18 form a closed circuit.

For the purpose of heating the cathode, there is provided outside of the evacuated envelope 10 a coil 22 which may be connected, as shown, to a source 23 of alternating current of relatively high frequency. The coil 22 is disposed closely adjacent to wire loop 21 and is inductively coupled therewith.

Alternately, the coil 22 may be connected, by means of a switch 24, to a winding 25 which may be disposed on the core 8 and inductively coupled with the grid winding 2 and anode winding 4 of the oscillator tube 1, thereby to derive the heating power for the cathode 13 from the oscillator.

A filter 26 of any suitable conventional construction may be provided, as shown, for filtering any residual fluctuations from the unidirectional voltage developed between the cathode 13 and the anode 12. The filtered unidirectional voltage can be derived from output terminals 27 and 28 with the polarity indicated on the drawing.

Fig. 2 shows a fragmentary view of the rectifier system with the parts shown in their normal positions. Thus the center portion of the transformer core 8, which comprises a plurality of E-shaped laminations, is inserted within the hollow space formed by the re-entrant stem 11. In this manner the grid winding 2 and the anode winding 4 of the oscillator tube 1 are closely disposed to the winding 14, thereby avoiding appreciable transformation losses.

Referring now to the operation of the system, the oscillator, comprising oscillator tube 1, windings 2 and 4 and transformer core 8, operates in the conventional manner and generates oscillations of a frequency in the order of 10,000 cycles or more. As is well known, the oscillating current developed by this type of oscillator is of an asymmetrical saw-tooth wave form. During the shorter portion of the saw-tooth cycle a voltage impulse of considerable magnitude is produced across the anode winding 4. This voltage is induced into the winding 14 and applies an alternating voltage of considerable magnitude between the anode 12 and the cathode 13 of the rectifier tube.

An oscillating current which may be of any suitable wave form is developed by the source 23 and supplied to the winding 22. Since the winding 22 is inductively coupled to the wire loop 21, a high-frequency current is induced therein which flows through the cathode 13 and raises its temperature to the point of thermionic emission of electrons.

Alternately, the winding 25, which is coupled to the anode winding 4 and grid winding 2 of the oscillator tube 1, may be connected to the winding 22, by means of switch 24, so that the oscillating current for the coil 22 is derived from the oscillator circuit including tube 1.

The unidirectional voltage developed between the cathode 13 and the anode 10 when these elements are energized by the high-frequency alternating voltage derived from the oscillator, is applied to the filter 26, wherein fluctuations of the unidirectional voltage so developed are filtered out. A filtered unidirectional voltage is thus provided across the output terminals 27 and 28.

It will be apparent that the present invention provides an improved rectifier in which satisfactory insulation is obtained by relatively simple means. The windings 14 and 21, being disposed within the evacuated envelope, are satisfactorily insulated without the requirement of substantial insulating materials as would otherwise be the case.

It will be appreciated that a part of the advantages of the system of the present invention are still obtainable even though one of the windings 14 and 21 is disposed outside of the envelope and provided with suitable insulation in the conventional manner. For example, the winding 14 may be disposed around the outside of the envelope 10 and suitably coupled to an energy-supplying primary winding. Such modifications are, of course, within the scope of the present invention.

Thus, while there has been described what is at present considered the preferred embodiment of the invention, it will be obvious to those skilled in the art that various changes and modifications may be made therein without departing from the invention, and it is, therefore, aimed in the appended claim to cover all such changes and modifications as fall within the true spirit and scope of the invention.

What is claimed is:

A unitary rectifier tube structure comprising an envelope having a hollow re-entrant stem, a cathode, an anode, and a secondary winding wound on said re-entrant stem within said envelope and supported thereby, said winding being connected to said anode and adapted to be coupled to a primary winding disposed in said re-entrant stem outside of said envelope.

PHILO T. FARNSWORTH.